United States Patent [19]
Ting et al.

[11] 3,816,743

[45] June 11, 1974

[54] SCINTILLATION COUNTING SYSTEMS AND COMPONENTS

[75] Inventors: Philip Ting, Brea, Calif.; Robert L. Litle

[73] Assignee: Beckman Instruments, Inc., Fullerton, Calif.

[22] Filed: Aug. 30, 1971

[21] Appl. No.: 176,135

[52] U.S. Cl. ........ 250/106 SC, 250/71.5 R, 350/321
[51] Int. Cl. ................................................ G01t 1/20
[58] Field of Search ................. 250/71.5 R, 106 SC; 350/321; 259/2; 195/103.5 R

[56] References Cited
UNITED STATES PATENTS
3,520,660    7/1970    Webb............................ 195/103.5 R Primary Examiner—James W. Lawrence
Assistant Examiner—Davis L. Willis
Attorney, Agent, or Firm—R. J. Steinmeyer; J. G. Mesaros

[57] ABSTRACT

Scintillation counting systems employing a permanently connected flowpath for introducing and removing mixtures of fluid scintillator and sample must be protected against admission of light and ultra-violet rays to the scintillation sensor through the flowpath. The invention provides an improved protection arrangement including a light trap which is a trap for light and a conductor for fluids. The use of two of those light traps, one upstream and one downstream from the sensor, are combined with a novel mixer to provide a continuous flow monitoring counter in which mixing of sample and scintillator and their introduction to the mixer can be visually monitored without introduction of outside light to the sensor.

14 Claims, 5 Drawing Figures

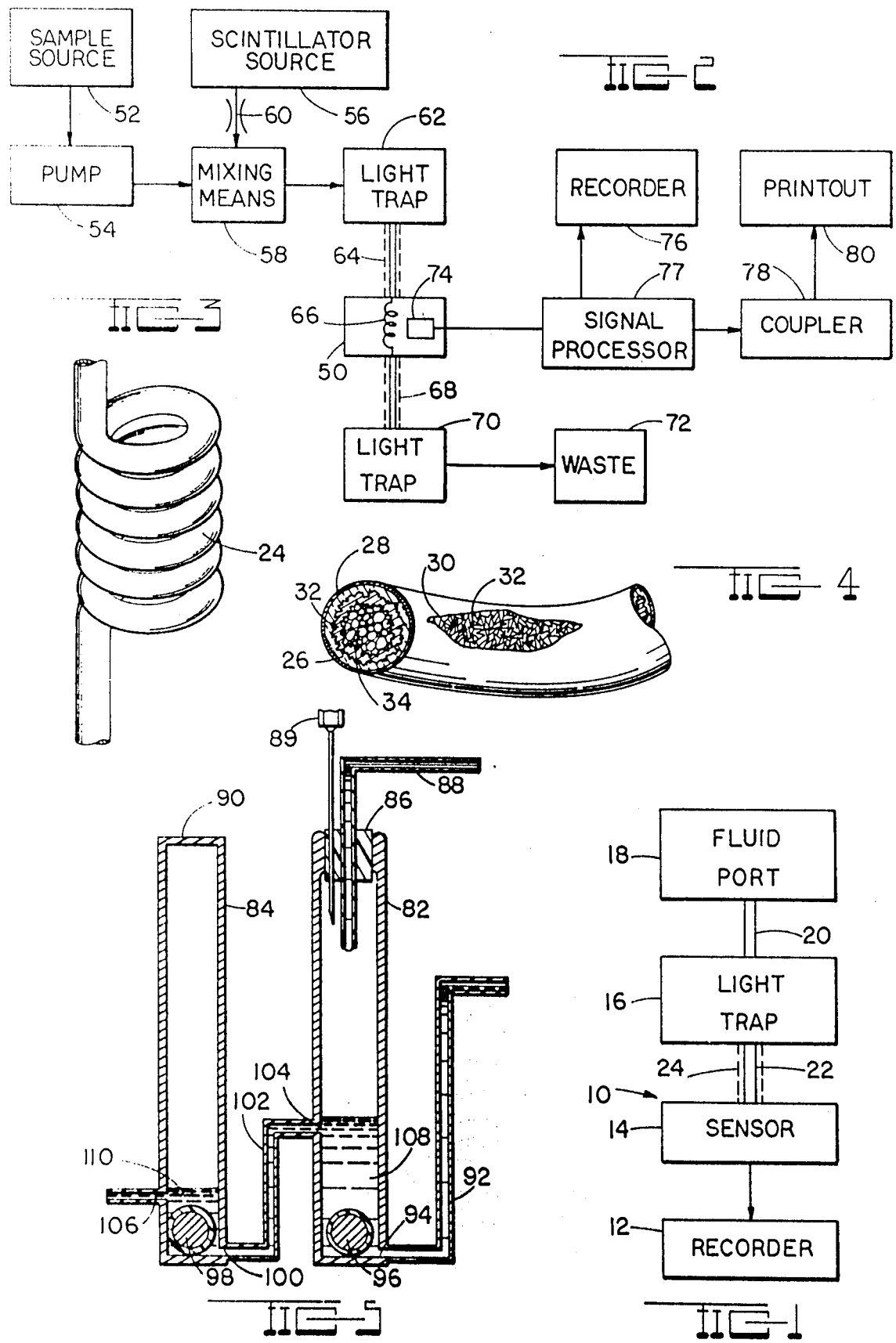

SCINTILLATION COUNTING SYSTEMS AND COMPONENTS

This invention relates to improvements in scintillator counting systems and components of such systems.

One of its objects is to provide means for improving the performance of systems that employ fluid scintillators particularly in liquid state. While not limited thereto, the invention is particularly effective in improving performance of systems in which there is a continuing flow of liquid scintillator and sample through the counting unit to provide continuous monitoring. Providing improved performance in that circumstance is another object of the invention.

Certain materials emit flashes of light or ultraviolet radiation upon being struck by a subatomic particle. This effect is called scintillation. The material which emits the light is called a scintillator. It is possible to determine the degree of activity in a radioactive material by placing that material near a scintillator and then counting the rate at which flashes or scintillations are produced. The flashes are usually detected by a photomultiplier tube where they are converted to electrical pulses. The pulses can be counted individually or collectively in an integration process.

The detection of the flashes is done in a sensing cell from which ambient light and radioactivity are excluded. The task of excluding extraneous light becomes complex when the scintillator is a fluid which must be replaced from time to time without opening the cell. One object of the invention is to provide an improved means including a light trap for solving that problem.

In the case where samples of active material must be monitored continually or at very frequent intervals, the problem is even more complex. To solve it, the invention includes an arrangement for mixing the sample with fluid scintillator at a point outside the sensing cell. The mixing apparatus is included in a continuous flowline that extends entirely through the cell. This arrangement is coupled with provision in the flowline, both upstream and downstream from the sensor, for impeding the flow of light to the cell through the line. In the preferred embodiment, that light impeding means includes a special light trap, one on the upstream side and one on the downstream side, in series with the flowline. The use of the two light traps permits visual observation and control of the mixing process and of the task of collecting the radioactive waste. It permits the use of a special mixing apparatus that is employed in the preferred embodiment of the invention and which enables the addition of sample liquid to the scintillator a drop at a time. The result is a convenient process employing inexpensive apparatus to get the material to be sensed into, and out of, the sensing unit.

The preferred mixer is a multichambered structure arranged so that the two liquids are combined in a first chamber for an initial mixing. The inlet and outlet openings of that chamber are arranged so that not less than a selected volume of material is subjected to a mixing action before any of it is discharged into the second chamber where it is again mixed. The second chamber is also arranged so that its inlet and outlet openings permit the outflow of mixed fluid only when the body of fluid being mixed in that chamber has no less than a selected volume. Advantageously, the agitation that results in mixing is accomplished with a magnet disposed within the chamber which is subjected to a changing magnetic field originating at a point outside the chamber. At least part of the wall of the upstream chamber is transparent so that the introduction of sample material can be observed visually. The mixture must be homogeneous and the flow rate continuous through the sensor. The special mixer provides this result notwithstanding that the ratio of sample to scintillator is so small that scintillator must be supplied in a continuous flow whereas sample is advantageously added drop by drop although not necessarily. Accuracy is assured in part by making the mixer wall transparent. The chamber wall being transparent, light is permitted to enter into the mixing device and to flow by successive reflection along the interior wall of the flowpath.

It is important that the flowpath be made of an inert material which is easily cleaned. Glass tubing is preferred. But glass tubing, however shielded and coated and colored, has heretofore proven to be a conductor of light. The difficulty is doubled when the flowpath is made continuous through the sensor to permit continuous flow from mixer to waste. The invention solves the problem by incorporating a light trap in the flowline at both sides of the sensor. It provides an especially advantageous light trap of a kind that is both a flowpath and a light trap and which can be produced in a very inexpensive yet efficient form. The result is a trap that makes it feasible to employ the transparent mixer of the invention and glass or glass-lined flowlines.

A glass flowline is capable of conducting light through the liquid within it by successive reflections from its inner surfaces. In addition, light can traverse the glass of the conduit wall and proceed down the conduit by successive reflection from the inner and outer surfaces of the conduit so that the light proceeds through the glass itself. In the invention, the conduit is provided with a roughened interior surface wall. The primary task of that roughened inner surface is to present a multitude of differently oriented surfaces in the path of the light that traverses the inside of the tube. Light will be absorbed at those surfaces or returned by them in the direction from whence it came. This arrangement is coupled with the introduction into the interior of the glass wall of another multitude of variously positioned optical interfaces which absorb or reflect back the light that traverses the interior of the conduit wall.

A variety of materials and techniques are available for accomplishing these results. In the preferred form of the invention, a granular, opaque, or nearly opaque, material is applied to the inner wall of the glass or plastic conduit and is fused to the conduit so that portions of the granular material occupy positions within the conduit wall and so that other portions project from the inner surface into the margins of the flowpath. This arrangement results in little resistance to the flow of the sample material and scintillator through the conduit but if it is applied over a significant length of the conduit inner surface it will effectively preclude the passage of light through the liquid by reflection along its inner surfaces. The same is true of light traversing the glass of the wall that forms the conduit. It is not necessary that the granular material be fused to the tubing to the extent that it extend entirely across the thickness of the tubing wall. It is enough that the inner surface is "optically roughened." If that condition extends over a significant length of conduit, virtually all of the light that traverses the interior thickness of the wall will eventually be dispersed and absorbed. The possibility of light beams passing the trap because of entry into the trap area on paths that are essentially parallel to the conduit axis, is materially reduced by bending the conduit in the region in which the conduit surface is roughened. A particularly advantageous form is created when the conduit is made helical in the region of its roughened surface. The helix should have a diameter larger than the diameter of the conduit by several times. This kind of an arrangement is effective from an optical standpoint while exhibiting a minimum of the kind of mechanical effects on the liquid coursing through it that would tend to separate the components of a liquid mixture. Additional quantities of inert granular material are loosely packed within the conduit along a portion of its length.

Many of the sample and scintillator liquids are difficult to mix. Accordingly, it becomes important to provide an arrangement in which the mixing can be accomplished directly in the flowpath to the sensing unit and that mixer and trap operation be coordinated. The several preferred components of the embodiment depicted in the drawings are entirely adequate and useful for a very wide range of sample materials and scintillator materials. These components have demonstrated in practical application that aqueous sample materials can be satisfactorily mixed with a continuous flow of multicomponent scintillators and that the mixture can be made to flow continuously through the system without a separation along the flowpath and in particular without separation and accumulation of particular materials in the trap area.

In the drawings:

FIG. 1 is a flow diagram of a simple scintillator counting system in which fluid is introduced into the sensor on a batch basis;

FIG. 2 is a block diagram of a scintillator recording system which can accommodate a continuous flow of sample and scintillator material;

FIG. 3 is a perspective drawing of a trap embodying the invention and suitable for use in the systems of FIGS. 1 and 2;

FIG. 4 is an isometric view of a fragment of the trap of FIG. 3; and

FIG. 5 is a view in vertical cross-section of a preferred form of the mixing means incorporated in FIG. 1 and which itself embodies the invention.

The basic system is shown in FIG. 1. The system objective is to record the occurrence of scintillations in a liquid scintillator resulting from radio-activity in a sample mixed with the scintillator. Thus, the output element of system 10 is a recorder 12. The scintillations are detected by a photomultiplier tube. It is necessary to exclude other visible and ultra-violet radiations from the tube so the detection is accomplished within a sensing unit 14 which is arranged to preclude the entry of light except that it is provided with a fluid port by which sample and scintillator may be introduced into the sensor and removed from it. Inside the sensor the container for the scintillator and sample is transparent and it is inert with respect to those materials. A particularly suitable material is glass.

Unless successive measurements are spaced by substantial intervals, it is advantageous to provide a permanent fluid conduit from the interior of the sensor to its exterior so that mixtures of scintillator and sample may be conveniently introduced into the sensor and removed from it. The system of FIG. 1 is so arranged. The preferred material for the conduit is glass. Sometimes it is infeasible to employ anything but glass. Any tubing material tends to conduct light. Glass complicates the problem because it conducts light entering at any point. It is easily coated or covered to preclude the entry of light along its length but it is often not possible to shield the inlet and outlet end. The system of FIG. 1 overcomes that problem by inclusion of a light trap 16 in series with the flow conduit between the sensor 14 and a fluid port 18 where mixtures of sample and scintillator are introduced to and withdrawn from the system. A conduit 20 extends from the fluid port to the light trap. The trap 16 is connected to the sensor 14 by another portion 22 of the conduit. In this embodiment, both of the conduits or flowpaths 20 and 22 are formed of glass. The dotted line 24 represents a shield that surrounds the conduit section 22 and precludes the entry of light. Thus, the system 10 contemplates measurement by the batch method utilizing a light trap of the kind which incorporates a through flowpath for liquid in a permanent connection from the scintillator and sample receptacle in the sensor to an inlet and outlet point.

A preferred form of trap is illustrated in FIGS. 3 and 4. The whole trap is shown in FIG. 3 where it is designated by the reference numeral 24. It is formed from a length of glass tubing which is turned into a helical form. The number of turns is not critical but its interior surface is treated and as increased number of turns reduces the possibility that occasional imperfections after treatment would permit the passage of small amounts of light. The trap of FIG. 3 is coated with an opaque material that is simply bonded to the exterior surface of the tubing. The glass itself is transparent. The interior surface of the tubing has been roughened and made generally opaque. In the preferred form of the invention, granulated alumina is first coated to the interior surface of the tubing wall and then is fused with the glass so that an optical roughening is accomplished both toward the external side and toward the internal side of the inner tubing surface. The preferred coating is easily applied. The tubing is filled with alumina suspended in potassium silicate, then is allowed to drain. Since that material wets the entire interior surface of the glass, a thin coating of the suspension remains on the interior surface when the tubing is drained. The tubing is then slowly heated until the coating has become bonded to the glass. If the glass itself is opaque, it is not necessary that the alumina actually fuse into the tubing wall but in preferred form the tubing is transparent so that the result of the processing can be inspected. In that case, the glass is heated until the alumina extends through any potassium silicate-glass interface. Any light traveling through the glass of the tubing wall will not be reflected from a glass-potassium silicate interface. It strikes the alumina instead.

Other materials may be substituted. Alumina thus applied presents many faces and facets arranged in many directions whereby it accounts for many reflections of incident light until that light is finally absorbed. Any other material exhibiting such attributes may be employed. The alumina should be quite finely divided but the size of those divisions is not particularly critical and the term "granulated" is intended to describe a size range from large grains down to powders.

The opaque coating on the exterior wall of the tubing of the trap is advantageously applied after its interior surface has been coated and the coating inspected. The fragment in FIG. 4 illustrates the interior construction of the trap. The glass wall of the tubing is designated 26. At its exterior surface it is covered by an opaque coating 28. A patch 30 of that coating has been removed. The layer 32 of alumina is visible through the patch and it is apparent that a roughened surface is presented to light which impinges on the interior surface of the treated tubing from inside the glass of the tubing wall. This feature is also visible at the end of the fragment of FIG. 4 where the tubing is shown in section. The layer of alumina 32 has been fused into the glass so that the interface between the alumina layer 32 and the glass wall 26 has become irregular.

Added impedance to conduction of light is provided by the loose particulate material with which the tubing is then filled in the preferred embodiment. The particles 34 are formed of alumina but any opaque particles sized to permit fluid flow in the spaces between them and inert to scintillator and sample, may be used. In fact, if the conduit is made of a nontransparent material, this loose particulate material is all that is needed to complete the trap.

This combined flow conduit and light trap has a special meaning in the system of FIG. 2. That system is arranged so that it will provide a continuous monitoring of a flowing sample. It has one flowpath for delivering the scintillator and sample liquid mixture to the sensor 50 and a separate flowpath for conducting the mixture from the sensor. Sample material from a source 52 is delivered by a pump 54 to a mixing means for mixing sample and scintillator material continuously. Scintillator from source 56 is delivered to the mixing means 58 through a flow rate controller in the form of a restrictor 60. The mixture is delivered to the sensor 50 through a light trap 62 via a shielded conduit 64. Inside the sensor the mixture flows through the scintillation chamber, transparent coil 66, and thence through a shielded conduit 68 to a second light trap 70. From the latter the liquid is permitted to flow to a collection apparatus called "waste" and identified by the numeral 72. Scintillations are sened in photomultiplier tube 74 whose electrical output is applied via a signal processor 75 to a recorded 76 and a couple 78. From the coupler signals are applied to a printout mechanism 80.

The system of FIG. 2 permits easy monitoring of sample on a continuous basis. The use of the light traps permits the mixing of scintillator and sample at a point where the process can be viewed and it greatly simplifies collection of waste because it eliminates any requirement that collection must be done in a light tight apparatus. Visual monitoring of the mixing process is very important where the quantity of sample to be introduced is so low that measurement by drop is desirable. In that case, the continuous flow of sample is converted to a discontinuous flow by drop. The drops are thoroughly mixed with flowing scintillator so that flow past the mixing point is again continuous. That kind of continuous monitoring requirement is provided in the system of FIG. 2 because of the coordination between the mixer and light trap.

A preferred form of mixer, one that will provide the system performance described above, is illustrated in FIG. 5. It comprises two containers, each having a fluid outlet removed from the lowest point of the container and each having an inlet at a point below its outlet and advantageously, as shown, adjacent its bottom end. The upstream container has its outlet elevated above the outlet of the downstream container. Both of the containers are closed and both have a substantial portion of their volume in ullage space above their respective fluid outlets. The downstream container is sealed with a permanent closure. In this embodiment, the upstream container is closed with a stopper through which a glass tubing extends for connection to a sample source. Both containers are provided with means by which the fluid they contain can be mixed. In the embodiment shown, each of the containers is provided with a magnet disposed at a point below its outlet. Both of the magnets are incapsulated in a coating that is impervious to the fluids that are to be mixed. When the mixer is placed in a cyclically varying magnetic field, those magnets are made to move and impart a mixing action to the liquids in which they are immersed.

In this embodiment, both the upstream container 82 and the downstream container 84 are cylindrical and they are arranged so that their axes are generally parallel and vertical. The upstream container 82 is closed by a resilient stopper 86 through which an L-shaped sample inlet tubing 88 and a hypodermic needle have been inserted. The upper end 90 of the downstream container 84 is sealed closed. An inlet conduit 92 for scintillator connects to a lower opening 94 in the upstream container next to the container bottom on which rests an incapsulated magnet 96. A similar incapsulated magnet 98 rests on the bottom of the downstream container adjacent to its bottom inlet 100 which is connected by conduit 102 to the outlet 104 of the upstream container. The outlet 106 of the downstream container is positioned below the outlet 104. Both of the containers 82 and 84 are made of transparent glass so that an operator may observe drops of sample falling from the lower end of the inlet tubing 88 and the needle 89. Those drops fall into a body of scintillator 108 which fills the lower end of the upstream container to a point in the region of its outlet. The scintillator and sample are partially mixed in that first container. The mixing task is completed in the second container whose body of fluid 110 comprises a mixture of sample and scintillator. The level of that fluid body 110 reaches and slightly exceeds the level of the output 106.

It is not essential that both containers be made of transparent material. It is enough if a portion of the upstream container is transparent in a region that permits counting of the drops emanating from conduit 88.

Although we have shown and described certain specific embodiments of our invention, we are fully aware that many modifications thereof are possible. Our invention, therefore, is not to be restricted except insofar as is necessitated by the prior art.

We claim:

1. For inclusion in a scintillator counting system of the kind which employs a conduit leading to the counting cell for introducing fluid samples to the cell from a place external to the sensor which is exposed to ambient light;

a light trap comprising an opaque area of conduit formed into a multi-turn helix and having irregularities along the inner surface of said helix over a substantial length thereof; and means for precluding entry of light into said conduit downstream from said trap.

2. The invention of claim 1 wherein said irregularities along the inner surface of said helix are formed of an inert, granulated material fused to the inner surface of said conduit.

3. The invention of claim 2 wherein said conduit is glass and said granulated material is alumina fused thereto.

4. The invention defined in claim 1 in which said trap further includes a portion along its length filled with loose particles of opaque material which is chemically inert.

5. The invention defined in claim 1 which further comprises means for introducing a continuous flow of liquid sample and liquid scintillator into said counting cell including a second conduit in series with said first mentioned conduit and leading from said cell, a second light trap in series in the second conduit, means for precluding introduction of light into the second conduit upstream from said second light trap, and mixing means for mixing a liquid scintillator with a liquid sample and introducing the mixture into said first mentioned conduit upstream from said first mentioned light trap.

6. The invention defined in claim 5 in which said mixing means comprises a mixer formed of two closed liquid chambers in series, the downstream chamber having an elevated outlet and an inlet at a point below said outlet, the upstream chamber having an outlet above the outlet of said downstream chamber and an inlet for scintillator liquid below its inlet, and means for introducing sample liquid into the upstream chamber.

7. The invention defined in claim 6 in which said upstream chamber is transparent at a point above its outlet and said means for introducing sample liquid comprises a resilient closure member located above the transparent point of the chamber whereby drops of sample fluid are visible as they are introduced to the chamber through said closure member.

8. The invention defined in claim 7 which further comprises two magnets, one disposed in each of said chambers.

9. The invention defined in claim 8 in which the trap comprises a glass tube having alumina and potassium silicate fused thereto along a length of its inner surface.

10. The invention defined in claim 4 in which said trap further comprises inert, granular material fused to the inner surface of said conduit.

11. For inclusion in a scintillator counting system of the kind in which a continuous flow of sample liquid is to be monitored and which includes a flowpath through the sensing units:

mixing means for combining liquid scintillator with sample liquid and introducing it into said flowpath upstream of the sensing unit; and means for impeding the introducing of light into the sensing unit through the flowpath downstream from the mixing means and downstream from the sensing unit;

said mixing means comprising a pair of closed containers each having an inlet near its lower end and an elevated outlet, the two containers being connected in series with one another such that the outlet of the upstream container is elevated above the outlet of the downstream container.

12. The invention defined in claim 11 in which the upstream container is closed by a removable stopper, the container wall being transparent whereby the introduction of fluid may be observed; and which comprises a pair of magnets one disposed in each container.

13. The invention defined in claim 11 in which said means for impeding the introduction of light comprises means for rendering the flowpath opaque.

14. The invention defined in claim 13 in which the means for impeding the introduction of light further comprises a pair of light traps in series with said flowpath, one downstream from the sensor and one between the sensor and said mixing means.

* * * * *